(12) United States Patent
Gronningsaeter

(10) Patent No.: US 11,609,209 B2
(45) Date of Patent: Mar. 21, 2023

(54) FLOODED MEMBER DETECTION BY MEANS OF ULTRASOUND

(71) Applicant: 4Subsea AS, Nesbru (NO)

(72) Inventor: Age Gronningsaeter, Kristiansand (NO)

(73) Assignee: 4Subsea AS, Nesbru (NO)

( * ) Notice: Subject to any disclaimer, the term of this patent is extended or adjusted under 35 U.S.C. 154(b) by 0 days.

(21) Appl. No.: 17/278,258

(22) PCT Filed: Sep. 5, 2019

(86) PCT No.: PCT/EP2019/073737
§ 371 (c)(1),
(2) Date: Mar. 19, 2021

(87) PCT Pub. No.: WO2020/057994
PCT Pub. Date: Mar. 26, 2020

(65) Prior Publication Data
US 2021/0356432 A1   Nov. 18, 2021

(30) Foreign Application Priority Data
Sep. 20, 2018   (NO) .................................. 20181225

(51) Int. Cl.
*G01N 29/02* (2006.01)
*G01N 29/22* (2006.01)
(Continued)

(52) U.S. Cl.
CPC .......... *G01N 29/02* (2013.01); *G01N 29/223* (2013.01); *G01N 29/2437* (2013.01);
(Continued)

(58) Field of Classification Search
CPC .. G01N 29/02; G01N 29/223; G01N 29/2437; G05B 19/042; G08B 21/20; G01F 23/2963
See application file for complete search history.

(56) References Cited

U.S. PATENT DOCUMENTS 4,445,363 A * 5/1984 Bennett ............... G01F 23/2961
73/40.5 A
10,551,238 B2   2/2020 Knowles et al.
(Continued)

FOREIGN PATENT DOCUMENTS

DE   196 43 956   5/1988
EP   2 327 967    6/2011
(Continued)

*Primary Examiner* — Tarun Sinha
(74) *Attorney, Agent, or Firm* — Levy & Grandinetti

(57) ABSTRACT

A sensor system for detecting water or air in a hollow member comprises a first acoustic sensor assembly in a first housing on one side of the hollow member, a second acoustic sensor assembly in a second housing on the opposite side, a controller unit connected to the first and/or second sensor assemblies, and where the first and second sensor assemblies and the controller unit are provided with power supply. Each of the first and second sensor assemblies comprises a set of probes connected to electronics for transmitting and receiving signals, and where the housings comprise fastening means for connecting the housings and the probes to the hollow member. The controller unit comprises a microcontroller, software for controlling and coordinating transmission and reception of signals between said probes, and means for registering and logging data generated by the sensor assemblies. A method detects water or air in a hollow member.

19 Claims, 2 Drawing Sheets

(51) Int. Cl.
*G01N 29/24* (2006.01)
*G05B 19/042* (2006.01)
*G08B 21/20* (2006.01)
*G10K 11/00* (2006.01)
*G10K 11/22* (2006.01)

(52) U.S. Cl.
CPC ........... *G05B 19/042* (2013.01); *G08B 21/20* (2013.01); *G10K 11/004* (2013.01); *G10K 11/22* (2013.01); *G01N 2291/021* (2013.01); *G01N 2291/022* (2013.01); *G01N 2291/048* (2013.01); *G01N 2291/10* (2013.01); *G05B 2219/25317* (2013.01)

(56) References Cited

U.S. PATENT DOCUMENTS

| | | | |
|---|---|---|---|
| 2012/0055253 A1* | 3/2012 | Sinha | G01F 1/74 73/622 |
| 2015/0276463 A1* | 10/2015 | Milne | B63B 22/20 73/19.1 |
| 2017/0016750 A1 | 1/2017 | Edward et al. | |
| 2018/0164142 A1* | 6/2018 | Gurumohan | G01F 23/804 |

FOREIGN PATENT DOCUMENTS

| | | | | |
|---|---|---|---|---|
| GB | 2 036 325 | | 6/1980 | |
| GB | 2036325 B | * | 5/1983 | ......... G01F 23/2961 |
| WO | WO 2012/067748 | | 5/2012 | |
| WO | WO 2018/115138 | | 6/2018 | |

* cited by examiner

FLOODED MEMBER DETECTION BY MEANS OF ULTRASOUND

INTRODUCTION

The present invention defines a non-invasive system and method for detecting if a hollow member is flooded, and more specifically to an acoustic sensor assembly suitable for being placed on the hollow member for monitoring over long periods of time.

BACKGROUND

Steel constructions may corrode over time. For offshore steel constructions having hollow members that are exposed to water over long periods of time, it is vital to be able to monitor and detect if water has penetrated areas where it should not be. The hollow member may for instance be a pipe that is normally filled with air. An example of a steel construction comprising pipes exposed to water breakthrough can be found in offshore installations below the water line. Detection of flooded pipe members in such a construction is vital for avoiding major accidents.

There are several different methods and systems for detecting if water is present inside a pipe. Some systems are permanently installed in or to a pipe to be monitored, while others are connected to the pipe in a period where measurements are performed. The last one is the most cost-efficient solution since it can be moved from one pipe to another but is not necessarily the most robust solution.

Use of non-invasive methods for detecting if water or air is present in a pipe is well known. Most prior art solutions are using acoustic transducers placed on one side of a pipe, and where these transmit ultrasound signals and receive the signals reflected from the other side of the pipe. This may however introduce problems related to the challenge of achieving a reliable echo from the distal wall and thus low accuracy in detection since reflected waves may not reach the receiver and/or may be buried in noise.

U.S. Pat. No. 4,445,363A describes a device for detecting flooding of a hollow structure such as a structural leg of an offshore rig, i.e. a pipe. The device comprises ultrasonic transducers for transmitting pulsed beams of ultrasonic sound to pass through opposing faced walls of the pipe. This solution uses a similar measuring principle as described above, i.e. transmitter and receiver placed at same side of a pipe. It thus has the same problems related to the risk of not achieving a reliable echo from the distal wall.

According to the present invention, a first acoustic sensor assembly is placed on one side of a hollow member, while a second acoustic sensor assembly is placed on the opposite side of the hollow member. Acoustic signals are transmitted from one side of the hollow member and received on the other side of the hollow member.

DE 196 43 956 A1 describes an ultrasonic transmitter and the receiver that are fitted to the outer wall of a vessel for controlling the level of liquids, such as metals, plastics, ceramics and the like. The transducers are angled and fitted either on the same side or on opposite sides of the vessel.

EP 2327967 A1 describes a liquid level sensor system, comprising an input acoustic waveguide, e.g. a rod, positioned such that it is extending into liquid to be sensed, the input waveguide being arranged to receive acoustic energy, e.g. from an acoustic generator; an acoustic sensor attached to the output waveguide for sensing acoustic energy at the output waveguide that have been transferred from the input waveguide to the output waveguide by being acoustically coupled by the liquid and a processor arranged to process timing characteristics of the sensed acoustic energy to determine a measure of the liquid level. This configuration is different from the present invention.

WO 2012/067748 A2 describes an ultrasonic sensor for detecting the presence or absence of an aerated fluid that includes a probe having a first portion and a second hollow portion. The probe has a closed end at the hollow portion. The solid portion and the hollow portion define an interface therebetween. A transducer element is mounted to the probe at about the solid portion. The transducer element is configured to transmit an ultrasonic signal through the solid portion into the hollow portion and to receive reflections of the ultrasonic signal to determine the presence or absence of a fluid and/or an aerated fluid.

Even though there are different solutions for detecting the presence of fluid, including a solution where a transmitter and a receiver are placed on each side of a pipe, none of these describes a system suited for long time monitoring of possible water penetration in a hollow member such as a pipe and doing this with high accuracy. Prior art systems are best suited for instantaneous measurements.

The sensor system according to the invention is easily transported and connected to any hollow member, such as a pipe to be monitored. The system can either be manually connected, or by an ROV.

With a set of acoustic probes in both the transmitter and the receiver, one can transmit ultrasound through a hollow member along several slightly different trajectories, and by analysing the result of such multiple receptions, increase the probability of correct detection, e.g. if water or air is present inside a pipe.

The present invention introduces an improved and versatile solution for detecting if a hollow member has been filled with water. If this is the case, an alarm can be set. The solution provides accurate measurements, is suited for being retrofitted, and it can be easily connected and disconnected to a hollow member by a ROV.

SHORT DESCRIPTION OF THE INVENTION

The invention is defined by a sensor system for detecting if a hollow member is flooded. More specifically, it provides a flexible method and system for detecting if the hollow member is filled with water or air. The solution provides accurate measurements and is optimized for being connected and disconnected to the hollow member by a ROV.

The sensor system for detecting if water or air is present in a hollow member, comprises a first acoustic sensor assembly mounted in a first housing placed on one side of the hollow member. The sensor system further comprises a second acoustic sensor assembly mounted in a second housing placed on the opposite side of the hollow member relative to the first housing.

The sensor system further comprises a controller unit connected to the first and/or second sensor assemblies. The first and second sensor assemblies and the controller unit are further provided with power supply.

According to the invention, each of the first and second sensor assemblies comprises a set of acoustic probes connected to electronics for transmitting and receiving signals, and where the housings comprise fastening means for connecting the probes to the hollow member.

Said controller unit comprises a microcontroller, and software for controlling and coordinating transmission and reception of signals between said probes and means for registering and logging data generated by the sensor assemblies.

Further features of the sensor system are defined in the dependent claims and will be described in detail in the detailed description below.

The invention is further defined by a method for detecting if water or air is present in a hollow member. The method is defined by providing a first sensor assembly that is mounted in a first housing and placing it on one side of the hollow member, and then providing a second sensor assembly that is mounted in a second housing and placing it on the opposite side of the hollow member relative to the first housing. The next step is providing a controller unit and connecting it to the first and/or second sensor assemblies and providing power supply to the first and second sensor assemblies and the controller unit.

The method is characterised in providing a set of acoustic probes, connected to electronics for transmitting and receiving signals, in the first and second sensor assemblies and connecting the probes to the hollow member by fastening means comprised in the first and second housings.

The method is further characterised in controlling and coordinating transmission and reception of signals between said probes by means of the controller unit and registering and logging data generated by the sensor assemblies.

Further features of the method for detecting if water or air is present in a hollow member are defined in the dependent claims and will be described in the detailed description below.

DETAILED DESCRIPTION OF THE INVENTION

The invention which is set forth in the independent claims and the dependent claims, describing alternatives of the invention, will now be described in detail with reference to the drawings illustrating examples of embodiments.

Figure 1A:
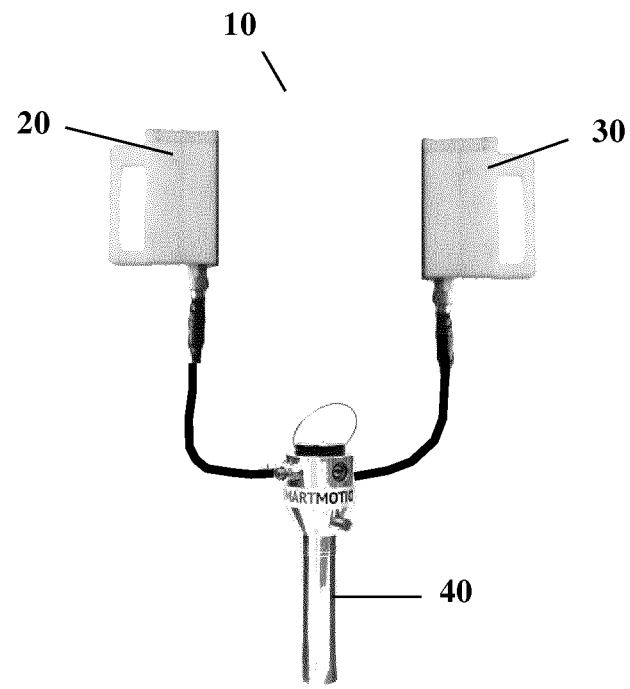
FIG. 1A shows the main components comprised in the sensor system.

The purpose of the present invention is to provide an improved and versatile solution for detecting/monitoring if water or air is present in a hollow member such as for instance a pipe 15. That is, if a hollow member that normally is filled with air has been filled with water. The solution is well suited for monitoring over long periods of time, e.g. months or years.

In the following detailed description, a pipe 15 is used as an example of a hollow member where monitoring of water break-through is made possible by the present invention. The invention is however suited for detection of water break-through in any hollow member, such as for instance a tank or container.

The sensor system 10 according to the invention comprises a first acoustic sensor assembly mounted in a first housing 20 placed on one side of a pipe 15 to be examined. It further comprises a second acoustic sensor assembly mounted in a second housing 30 placed on opposite sides of the pipe 15 relative to the first housing 20.

The first sensor assembly and the first housing 20 are preferably identical to the second sensor assembly and the second housing 30. The housing can be made of any material, such as Polyoxymethylene (POM) or acid-proof stainless steel.

The first and/or second sensor assemblies are connected to a controller unit 40. There are three different connection configurations. The first embodiment is that the controller unit 40 is connected to both the first and the second acoustic sensor assemblies. The second embodiment is that the controller unit 40 is connected to only the first acoustic sensor assembly. The third embodiment is that the controller unit 40 is connected to only the second acoustic sensor assembly.

Figure 1B:
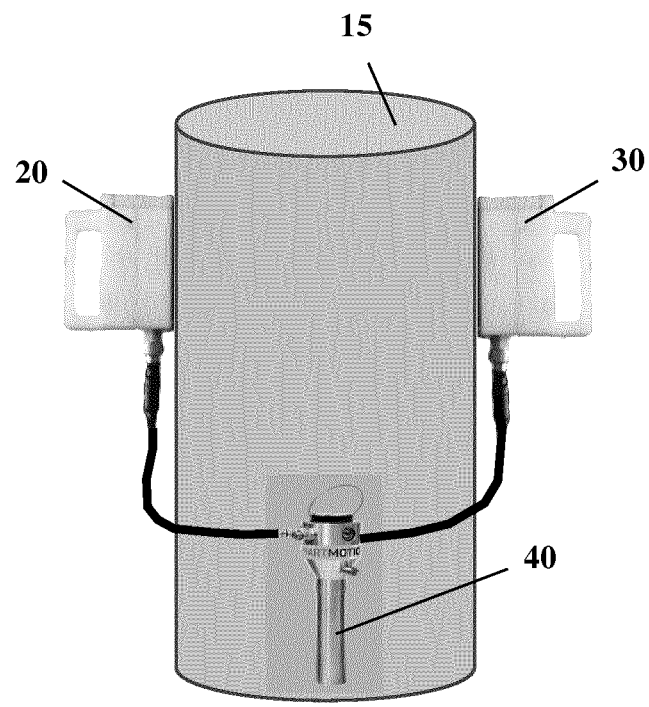
FIG. 1B illustrates the sensor system when connected to a hollow member such as a pipe.

In one embodiment, the controller unit 40 is provided as an external unit separate from the first and the second housings 20, 30 holding the sensor assemblies, as illustrated in FIGS. 1A and 1B.

The figures further illustrate said embodiment where the controller unit 40 is connected to both the first and the second acoustic sensor assemblies. As mentioned, the controller unit 40 may be connected to only either the first or the second sensor assembly.

In this configuration, the sensor assembly that is not connected to the controller unit 40 will transmit signals at regular intervals, while the other sensor assembly that is connected to the controller unit 40 receives and interprets the signals.

In one embodiment, the controller unit 40 is integrated in either the first housing 20 or the second housing 30. The controller unit 40 is then wired to the sensor assembly it is sharing the housing with.

Figure 2:
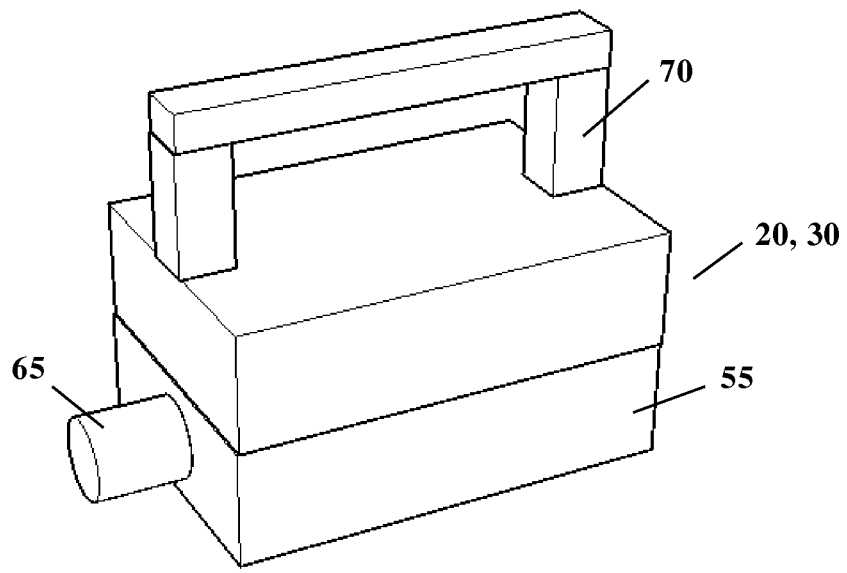
FIG. 2 shows the housing holding the acoustic sensor assembly.
Figure 3:
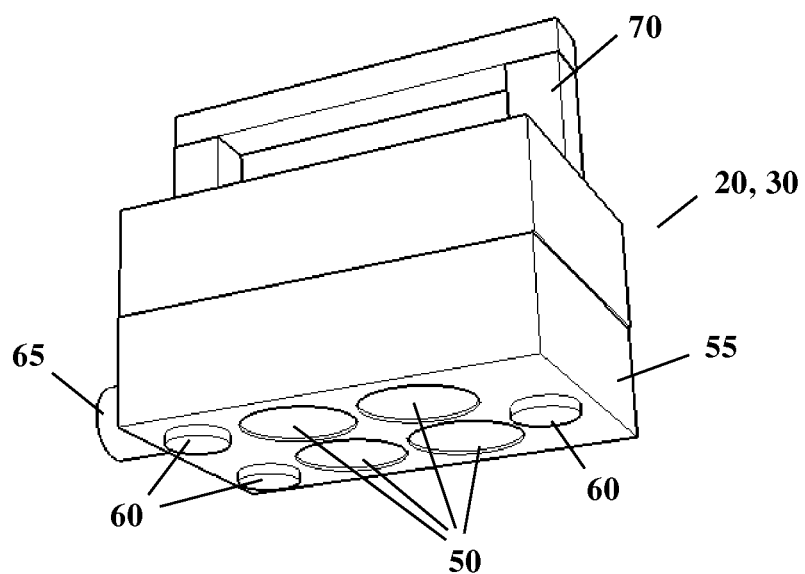
FIG. 3 illustrates another view of the housing showing the probes and fastening means.

Each housing 20, 30 is preferably made water and pressure tight. FIGS. 2 and 3 illustrate examples of a housing made with an upper part and a bottom part. The acoustic sensor assembly is mounted in the space available inside the housing, and a seal assembly is provided between the upper and bottom part of the housing.

The sensor assemblies and the controller unit 40 are all provided with a power supply such as batteries. Power supply may also be provided via cables or a combination.

Each of the first and second sensor assemblies comprises a set of acoustic probes 60 connected to electronics for transmitting and receiving signals. In one embodiment, the probes 60 are protruding a few mm through the housings 20, 30, as illustrated in FIG. 2. The number of probes included in the set of probes 60 may vary according to application and required measurement accuracy. It is sufficient with only one probe, but more probes 60 provide a higher probability of correct detection. FIG. 3 shows three probes which are sufficient for providing a stable mechanical support and acoustic connection to the pipe 15.

In one embodiment, the probes are connected to and integrated as part of the base plate 55 without protruding through the base plate 55. In another embodiment, the probes 60 are bolts running through the base plate 55, and where each bolt is sealed to the base plate 55 with an O-ring.

Each housing 20, 30 further comprises fastening means for connecting the probes 60 to the pipe 15. FIG. 2 illustrates that four magnets 50 are connected to a housing and being used as fastening means. A housing can also in addition be secured to a pipe by straps or special brackets. A housing may also comprise a handle 70. This is practical when a person, e.g. a diver, is connecting a housing to a pipe 15.

In one embodiment the housing comprises connection means suited for interaction with a ROV that is transporting and connecting a housing to a pipe.

FIGS. 2 and 3 further show a lead-in wire connection 65 used for connecting the sensor assembly mounted in a housing 20, 30 to the controller unit.

The angle of the probes 60 relative to a housing may be optimized according to the diameter of the pipe 15 it is to be connected to. Each probe 60 may therefore be tilted in slightly different direction relative to each other for optimal transferring of acoustic energy.

In one embodiment of the invention, the probes 60 comprise piezoelectric ultrasound transducers operating at 1 MHz. In another embodiment, each probe may comprise piezoelectric ultrasound transducers operating at different frequencies, e.g. between 0.5-5 MHz. Magneto-strictive transducers may be used instead of piezo-electric transducers, or a combination of magneto-strictive and piezo-electric transducers may be used.

In one embodiment, each probe 60 is provided with a material giving optimal acoustical connection or coupling between a probe 60 and the pipe 15. A paste for providing optimal acoustic coupling to the pipe 15 may further be applied between the end of the probes 60 and the pipe 15. This is particularly advantageous when the system is used for measuring on pipes that are not submerged in water.

The controller unit 40 described above is the main means for controlling signals transmitted between the probes 60 comprised in the acoustic sensor assemblies in the first and second housings 20, 30. For doing this, the controller unit 40 is connected to said electronics for transmitting and receiving signals in the first and/or second sensor assemblies. The controller unit 40 comprises a microcontroller and software for controlling and coordinating transmission and reception of signals between said probes 60 and means for registering and logging data generated by the sensor assemblies.

The controller unit 40 may, in one embodiment, further comprise a transmitter for transmitting signals to another location. This may be a remote or a nearby location. In one embodiment, the transmitter is an optical transmitter, e.g. IR-transmitter, adapted for transferring optical signals through a window installed in the controller unit 40 to an ROV. This embodiment is suited for transferring signals upon request by an ROV positioning itself near said window used for transferring optical signals.

In one embodiment, the transmitter is communicating to a remote location via a local and a remote acoustical modem.

The invention is further defined by a method for detecting if water or air is present in a hollow member, e.g. a pipe. The method comprises several steps where the initial steps are providing a first sensor assembly that is mounted in a first housing 20 and placing it on one side of the hollow member and providing a second sensor assembly that is mounted in a second housing 30 and placing it on the opposite side of the hollow member relative to the first housing 20. The next step is providing a controller unit 40 and connecting it to the first and/or second sensor assemblies and providing power supply to the first and second sensor assemblies and the controller unit 40.

The method is characterised in providing a set of probes 60, connected to electronics for transmitting and receiving signals, in the first and second sensor assemblies, and then connecting the probes 60 to the hollow member by fastening means comprised in the first and second housings 20, 30.

The next step is controlling and coordinating transmission and reception of signals between said probes 60 by means of the controller unit 40 and registering and logging data generated by the sensor assemblies. This can for example be performed by letting the controller 40 send a command to sensor assembly, instructing it to transmit a pulse on probe 1, and send a command to sensor assembly, instructing it to receive data from probe 1, and transfer the result to the controller unit 40.

In one embodiment, signals are transmitted from each probe 60 in the first sensor assembly, and signals transmitted from each probe 60 are received on every probe 60 in the second sensor assembly. This means that signals from one probe in a set of probes in the first sensor assembly are successively received at each probe 60 comprised in the second sensor assembly.

When for instance three probes, e.g. T1, T2 and T3, are used as transmitters in the first sensor assembly, and three probes, e.g. R1, R2 and R3, are used as receivers in the second sensor assembly, a signal can be transmitted from probe T1 and this signal can be received on all probes R1, R2 and R3. Then a signal can be transmitted from probe T2, which is received on all probes 60 in the second sensor assembly. At last a signal is transmitted from T3, which is received on all probes 60 in the second sensor assembly. In this way, signals transmitted will follow nine different trajectories.

The controller unit 40 which is connected to the three transmitting probes and three receiving probes, will collect and log data related to the nine different trajectories from the sensor assemblies in the first and second housings 20 to 30.

For improving accuracy in the measurements, the whole procedure described above can be repeated in reversed order, i.e. the second sensor assembly transmits signals, while the first sensor assembly receives signals. A total of 18 different signal paths are then produced.

The primary signal path used for detecting water in for instance a pipe is the straight line trajectory from a transmitting probe to a receiving probe, i.e. through the lumen of the pipe. However, an acoustic wave may find its way from the transmitting probe to the receiving probe via the steel wall of the pipe, even if the pipe is filled with air. Such wave may be reflected back and forth between the inner and outer surface of the pipe wall. The distance from the transmitter to the receiver will be longer then the straight line, but since the velocity of sound in steel is higher than that of water, such undesired wave would arrive before a corresponding desired straight trajectory wave through water. Such false alarm signal cannot easily be discriminated from a true water signal.

In one embodiment of the method statistical analysis is performed on logged data for improving detection results of water or air. This is especially useful when several signal paths are produced and logged. Statistical analysis may increase the probability for correct detection of water or air and reduce the risk for false alarms.

Different types of signals can be transmitted via the probes 60. Examples are pulse train signals having a single frequency of for instance 1 MHz. It may alternatively be a pulse carrying more information, such as a chirp pulse, or a combination of different types of pulses. The aim is to increase the probability of correct detection of water presence and minimize the risk of false alarms.

In one embodiment, an alarm indicating water breakthrough can be stored in the controller unit 40 and transferred to a read-out unit when prompted for transferring data, e.g. via an optical modem.

In another embodiment, an alarm signal can be transmitted once water break-through in a hollow member is detected. The alarm signal can be transferred by cable, acoustic link, or by applicant's own SMS Satellite™ which is designed to transfer data from autonomous subsea sensors back to shore by means of satellite communication.

As mentioned, the present invention introduces an improved and versatile solution for detecting and warning if a hollow member has been filled with water. The solution is well suited for being retro-fitted and for long-term monitoring.

The invention claimed is:

1. A sensor system for detecting if water or air is present in a hollow member, comprising a first acoustic sensor assembly mounted in a first housing placed on one side of the hollow member, a second acoustic sensor assembly mounted in a second housing placed on the opposite side of the hollow member relative to the first housing, a controller unit connected to the first and/or second sensor assemblies, and where the first and second sensor assemblies and the controller unit (40) are provided with power supply, wherein
   each of the first and second sensor assemblies comprises a set of probes connected to electronics for transmitting and receiving signals, and where the housings comprises fastening means for connecting the housings, and thus the probes, to the hollow member, and where
   the controller unit comprises a micro-controller, software for controlling and coordinating transmission and reception of signals between said probes and means for registering and logging data generated by the sensor assemblies; and
   wherein each probe in the first sensor assembly on one side of the hollow member is configured to transmit an acoustic signal to each probe in the second sensor assembly on the opposite side of the hollow member for subsequent registering and logging by the controller unit; and each probe in the second sensor assembly is configured to transmit an acoustic signal to each probe in the first sensor assembly for subsequent registering and logging by the controller unit.

2. The sensor system according to claim 1, wherein the controller unit is provided as an external unit separate from the first and the second housings.

3. The sensor system according to claim 1, wherein the controller unit is wirelessly connected to the first and/or second sensor assemblies for enabling communication.

4. The sensor system according to claim 1, wherein the controller unit is integrated in the first and/or the second sensor assemblies.

5. The sensor system according to claim 1, wherein the first and second housings are water and pressure tight.

6. The sensor system according to claim 1, wherein the first and second housings comprise a handle.

7. The sensor system according to claim 1, wherein the base of the housing comprises magnets used as fastening means.

8. The sensor system according to claim 1, wherein the first and second sensor assemblies each comprises three acoustic probes providing a stable mechanical support.

9. The sensor system according to claim 8, wherein each probe is tilted for transferring acoustic energy in slightly different directions.

10. The sensor system according to claim 1, wherein each probe is provided with a material giving optimal acoustical coupling between a probe and the hollow member.

11. The sensor system according to claim 1, wherein the first and second acoustic sensor assemblies comprise 1 MHZ piezoelectric ultrasound transducers.

12. The sensor system according to claim 1, wherein the controller unit is further connected to a transmitter for transmitting signals to another location.

13. The sensor system according to claim 1, wherein the hollow member is a pipe.

14. A method for detecting if water or air is present in a hollow member by providing a first sensor assembly that is mounted in a first housing and placing it on one side of the hollow member, providing a second sensor assembly that is mounted in a second housing and placing it on the opposite side of the hollow member relative to the first housing, providing a controller unit and connecting it to the first and/or second sensor assemblies, and providing power supply to the first and second sensor assemblies and the controller unit, wherein
   providing a set of probes, connected to electronics for transmitting and receiving signals, in the first and second sensor assemblies, and connecting the housings, and thus the probes to the hollow member by fastening means comprised in the first and second housings;
   controlling and coordinating transmission and reception of signals between said probes by means of the controller unit and registering and logging data generated by the sensor assemblies; and
   transmitting acoustic signals from each probe in the first sensor assembly on one side of the hollow member to each probe in the second sensor assembly on the opposite side of the hollow member for subsequent registering and logging by the contoller unit; transmitting acoustic signals from each probe in the second sensor assembly to each probe in the first sensor assembly for subsequent registering and logging by the controller unit.

15. The method according to claim 14, for signals transmitted from each probe in the first sensor assembly, successively receiving and logging data from each probe comprised in the second sensor assembly.

16. The method according to claim 14, further comprising transmitting acoustic signals from each probe in the second sensor assembly and, for signals transmitted from each probe in the second sensor assembly, successively receiving and logging data from each probe comprised in the first sensor assembly.

17. The method according to wherein transmitted acoustic signals are chirp pulses.

18. The method according to claim 14, performing statistical analysis on logged data for improving detection results of water or air.

19. The method according to claim 14, transmitting an alarm signal if water is detected.

* * * * *